United States Patent [19]

Horii

[11] Patent Number: 4,969,481

[45] Date of Patent: Nov. 13, 1990

[54] METHOD FOR TRANSFERRING SHORT FIBERS

[75] Inventor: Kiyoshi Horii, Tokyo, Japan

[73] Assignee: Fukuvi Chemical Industry Co., Ltd., Fukui, Japan

[21] Appl. No.: 298,979

[22] Filed: Jan. 19, 1989

[30] Foreign Application Priority Data

Jun. 17, 1988 [JP] Japan ................. 63-149480

[51] Int. Cl.⁵ ............................................. F15C 1/16
[52] U.S. Cl. .................... 137/13; 137/813; 137/828
[58] Field of Search .............. 137/1, 812, 813, 828, 137/13, 808

[56] References Cited

U.S. PATENT DOCUMENTS 4,206,783  6/1980  Brombach ............... 137/813
4,612,959  9/1986  Costello ................. 137/828
4,721,126  1/1988  Horii ..................... 137/1
4,817,863  4/1989  Bragg et al. ............ 137/813

Primary Examiner—A. Michael Chambers
Attorney, Agent, or Firm—Wenderoth, Lind & Ponack

[57] ABSTRACT

The present invention provides a method for transferring agglomerative short fibers such as natural fibers, ceramic fibers or metals, by means of a Coanda spiral flow produced by feeding a pressurized fluid. In this fluid-transfer, short fibers can be smoothly transferred with an orientation while causing swelling and dissociation of agglomerates thereof. The defects inevitable in the conventional transfer under turbulent flow conditions such as adherence of fibers to the inner wall of the pipe, agglomeration and breakage of whiskers are completely solved. High-speed oriented-transfer at a speed of several to 100 m/second is possible by means of the Coanda spiral flow.

4 Claims, 2 Drawing Sheets

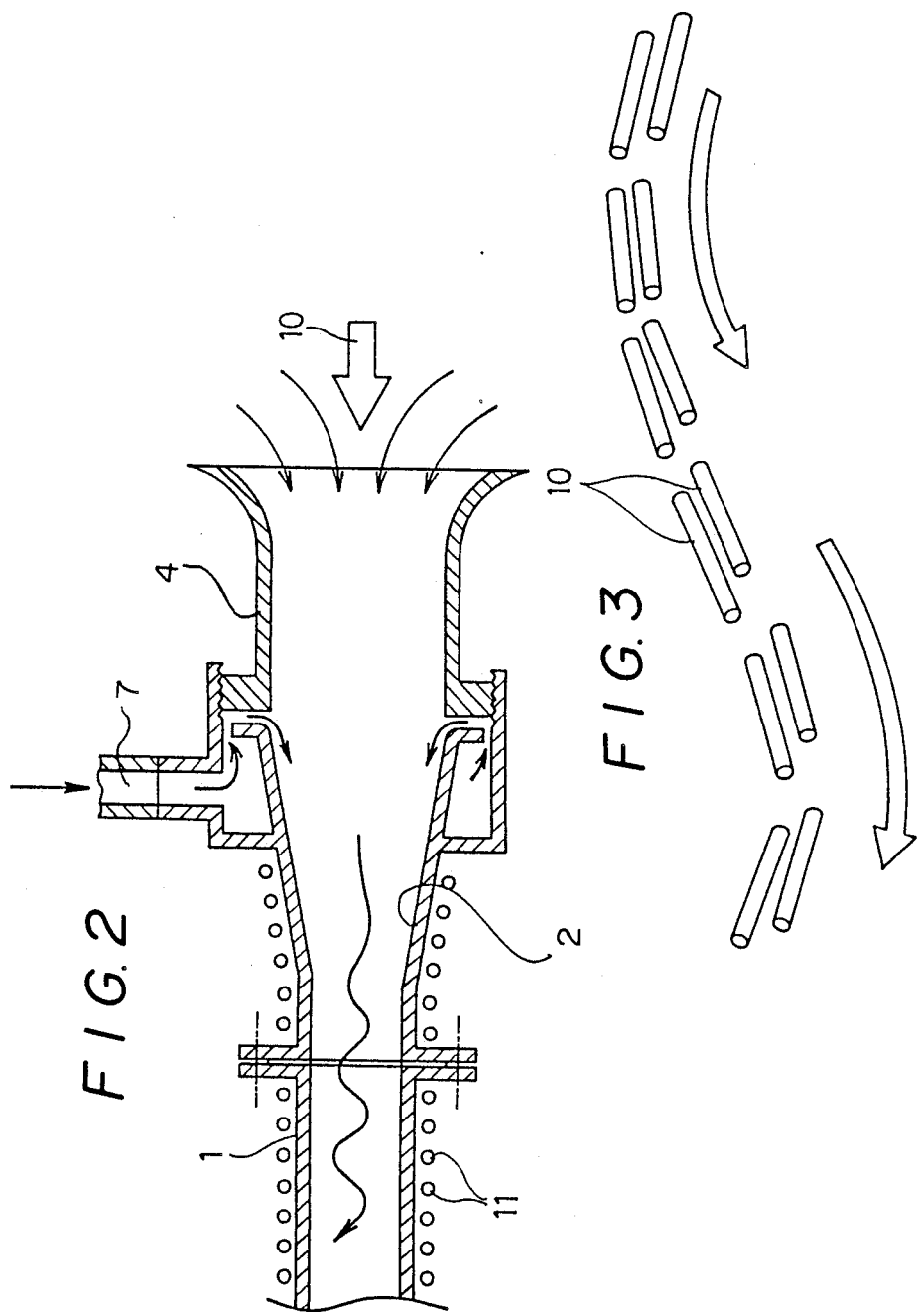

METHOD FOR TRANSFERRING SHORT FIBERS

FIELD OF THE INVENTION

The present invention relates to a method for transferring short fibers, and more particularly, to a method which enables to transfer short fibers tending to agglomerate such as natural fibers, synthetic fibers, ceramic fibers, and metals, smoothly while dissociating agglomerates thereof and giving an orientation.

PRIOR ART

Short fibers comprise any of various materials such as natural fibers, synthetic fibers, ceramic fibers and metals, and are popularly used as materials to be blended into a composite materials. For the purpose of transferring these short fibers to a prescribed place such as plant or a construction site for mixing them with cement or plastics, it is the conventional practice to transfer them in a container or on a belt conveyor, and it has not been tried to transfer by means of a high-speed fluid.

This is due to the fact that, when being fluid-transfered by means of a high-speed fluid, short fibers tend to easily agglomerate, and resulting agglomerates adhere to the pipe wall and cohere there, thus clogging the path through the pipe. Easy agglomeration of short fibers in the manufacturing stage makes it difficult to accomplish fluid-transfer of them.

In addition, in the case of whiskers having a diameter of 0.1 μm and a length of 10 μm, for example, the conventional method for fluid-transfer by means of such a fluid as air is defective in that the acicular crystal grain itself of whisker is broken.

The fluid-transfer cannot therefore be employed as a means to transfer short fibers, and the methods of using a container or a belt conveyor have conventionally been utilized.

There has however been a limitation, in these conventional methods, in improving the transfer efficiency by increasing the speed of transportation. As short fibers after transfer are in an agglomerated state in which fibers are entangled with each other to the same as or even more serious degree than before transfer, it is not easy to achieve uniform mixing into cement or plastics. It has therefore been necessary to cause swelling or dissociation prior to mixing, or to conduct strong stirring for mixing.

There is therefore a demand for the development of a new transfer method taking place of these conventional ones.

SUMMARY OF THE INVENTION

An object of the present of the invention is to provide a novel method for transferring short fibers, which solves the problems in the conventional methods and permits appropriate application of the fluid-transfer method to the transportation of short fibers and transfer at a high efficiency while dissociating agglomerating short fibers.

For the purpose of achieving the above-mentioned object, the present invention provides a method for transferring short fibers, characterized by comprising oriented-transferring short fibers, while causing swelling and dissociation of agglomerates of said short fibers by means of a Coanda spiral flow produced in the pipeline through feeding of a pressurized fluid.

The present invention provides also a method for transferring agglomerating short fibers in the heated state.

BRIEF DESCRIPTION OF THE DRAWINGS

FIGS. 1 and 2 are sectional views illustrating embodiments of the apparatus for the satisfactory application of the present invention;

FIG. 3 is an enlarged perspective view illustrating a state of the oriented transfer. In the drawings, the reference numerals represent the following parts and components:

Figure 1:
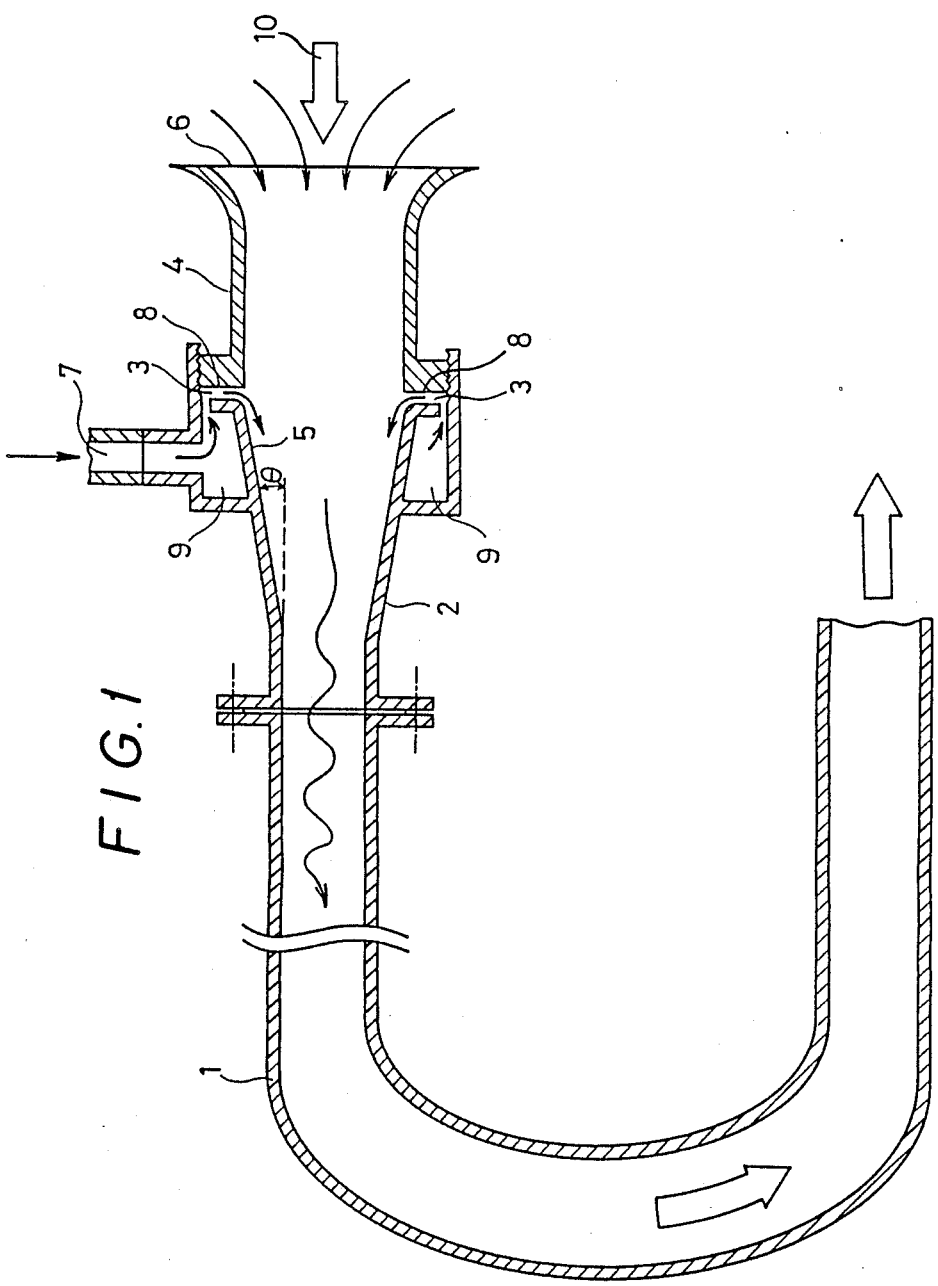

1: Pipeline,
2: Main cylinder,
3: Fine gap,
4: Auxiliary cylinder,
5: Curved wall surface,
6: Inlet port,
7: Pressurized gas feed pipe,
8: Auxiliary cylinder wall surface,
9: Distribution chamber,
10: Short fiber,
11: Heating means.

DETAILED DESCRIPTION OF THE INVENTION

Unlike a laminar or a turbulent flow known as the conventional concepts of fluid motion, the Coanda spiral flow utilized in the present invention was found by the present inventor to be in a state of motion different from a turbulent flow while being in a motional condition of a fluid falling under the region of turbulent flow. A method for forming this type of flow has already been proposed by the present inventor.

More particularly, this Coanda spiral flow is a flow of a fluid which moves forward at a high speed in the pipeline direction while following a spiral shape, and can be formed by applying a vector in the pipe radial direction to the vector of flow of the fluid introduced in the pipeline direction. In this case, a strong negative pressure of aspiration on the side opposite to the advancing direction of the Coanda spiral flow, and the highest axial flow based on this spiral flow near the pipe axis are formed.

The present invention permits fluid-transfer of agglomerative short fibers which has so far been difficult to accomplish, by the use of such features of a Coanda spiral flow formed in the pipeline. More specifically, collision against the pipe wall, adherence and cohesion of fibers are prevented in the present invention by the use of the highest axial flow of a Coanda spiral flow into which short fibers are introduced.

By conducting oriented transfer of short fibers on a fluid advancing at a high speed while following a uniform spiral, cohesion caused by mutual collision of short fibers is eliminated, and at the same time, the initial state of agglomeration is also dissociated. In this case, it is possible to accelerate dissociation of the state of agglomeration by alleviating frizzling of fibers through transfer of short fibers in the heated state, in response to the kind of material of short fibers.

The negative pressure of a strong aspiration formed on the side opposite, relative to the advancing direction, to the generating region of the Coanda spiral flow allows rapid introduction of short fibers into the Coanda spiral flow, and hence high-speed transfer at a high efficiency.

The method of the present invention is described below with reference to the drawings.

FIG. 1 is a sectional view illustrating an embodiment of the present invention, together with the apparatus for producing a Coanda spiral flow.

In the embodiment shown in FIG. 1, for example, a main cylinder (2) is connected to the end face of a pipeline (1) having an inside diameter of from 6 to 200 mm and a length of from several to 200 m, so that the cylinder diameter is equal to that of the pipeline.

An annular fine gap (3) for pressure-feeding to an inert gas air, a liquid or other prescribed fluid in a transverse direction under a pressure of from 1 to 10 kg/cm$^2$ is formed in the main cylinder (2), and the fine gap (3) is provided with a feed pipe (7) for feeding that fluid.

The main cylinder (2) has its diameter becoming relatively larger from the connecting surface with the pipeline (1) toward the fine gap (3) and this forms a smoothly curved wall surface (5). Furthermore, an auxiliary cylinder (4) is provided on the end face of the main cylinder (2) opposite to the pipeline (1) and an inlet port (6) of short fibers is formed at the end of the auxiliary cylinder (4). In this case, the wall surface (8) of the auxiliary cylinder (4) is folded at right angles or at an acute angle on the side opposite to the wall surface (5) of the fine gap (3).

In such an apparatus, the fine gap (3) should preferably have a structure permitting adjustment of the gap.

There is no particular limitation in structure for the pipe (7) feeding the pressurized fluid to the fine gap (3). For the purpose of permitting uniform feeding of the pressurized fluid, for example, a distribution chamber (9) may be provided so as to surround the main cylinder (2) and ensure communication between this distribution chamber (9) and the fine gap (3).

Varying with the pressurized fluid used, the inclination angle $\theta$ of the main cylinder (2) should preferably be such that tan $\theta$ becomes about $\frac{1}{4}$ to $\frac{1}{8}$ when air is used as the pressurized fluid, and in this case, the ratio of the inside diameter of the pipeline (1) to that of the main cylinder (2) should preferably be from about $\frac{1}{2}$ to 1/5. By doing so, the flow velocity of air in the pipeline (1) can be increased to 4 to 25 times the flow velocity in the main cylinder (2), thus permitting transfer at a high speed of from 20 to 130 m/second. It is furthermore possible to effectively dissociate agglomerates of the fibers to be transferred and impart an orientation to them to be transferred.

When applying the method of the present invention by means of such an apparatus, pressurized air of from 2 to 10 kg/cm$^2$ is introduced through the fine gap (3) into the main cylinder (2), and at the same time, the pressurized air is introduced also from the inlet port (6) into the main cylinder (2). Thus, a motional vector of the air flow from the fine gap (3) and another motional vector of the air flow from the inlet port (6) are synthetically formed under the influence of an aerodynamic action (Coanda effect), and an inclined flow (spiral motion) directed from the fine gap (3) exit toward the pipeline (1) is produced on the wall surface (5). As a result, a dynamic boundary layer is formed near the inner wall surface in the pipeline (1), while a strong negative aspiration is produced near the inlet port (6) on the side opposite to the advancing direction of the air flow. After a Coanda spiral motion of the carrier fluid is formed, short fibers (10) are fed into the inlet port (6). The short fibers (10) are thus attracted by the strong aspiration into the pipeline (1), and advance as a spiral flow through the pipeline (1). In this case, short fibers (10) never adhere to the pipe wall of the pipeline (1), but advance while the state of agglomeration in the initial stage of feeding is dissociated.

By the application as described above, the agglomerative short fibers can be oriented-transferred at a high transfer efficiency while dissociating agglomerates. In the present invention, furthermore, it is also possible to transfer short fibers in the heated state as required to improve the dissociating efficiency. In this case, as shown in FIG. 2, for example, heaters or other heating means (11) are provided around the pipeline (1) of the Coanda spiral flow generating apparatus. As cohesion can be alleviated by softening the short fibers (10) through heating, it is possible to improve the dissociating effect by means of the Coanda spiral flow.

One of the features of the method of the present invention is that transferring short fibers by means of a construction as shown in FIG. 1, the short fibers (10) show an orientation accurately directed along the locus of the spiral as shown in the enlarged view of FIG. 3. Presence of this orientation prevents cohesion of the short fibers from occurring during transfer. In addition, the orientation of the short fibers ejected from the exit of the pipeline is kept constant, and it thus becomes possible to effectively utilize it in the manufacture of various materials, particularly composite materials.

This oriented transfer can solve the problem of breakage of whiskers acicular crystals made of extra-short fibers which is inevitable in the conventional fluid-transfer under the turbulent condition.

The method of the present invention, while relating to transfer of short fibers, can comprise causing a chemical reaction in the course of transfer, for example, by introducing a reactive gas as the carrier fluid and using heating equipment as shown in FIG. 2 and causing a surface reaction between the reactive gas and the short fibers.

Using a transparent pipeline (1), the reaction may be caused by projecting light from outside.

While the above embodiment has been described on the assumption of the length of the pipeline (1) of from several to 200 m, it is needless to mention that the present invention is not limited to this range of the pipeline length. It is also possible to intensify the spiral flow by providing Coanda spiral flow generating apparatus in the middle of the pipeline (1) and the exit end thereof and thus strongly attracting the carrier fluid.

The pipeline (1) may have a bend. In this case, the method of the present invention can be applied more effectively by converging toward one end and diverging toward the other.

The short fibers transferrable by the method of the present invention should preferably have a length within the range of from 10 $\mu$m to about 3 to 4 cm, and the material of the short fibers may be any of natural fibers, synthetic fibers, ceramic fibers, metal fibers and the like. The pressurized fluid may be any of air, inert gases, reactive gases and liquids.

Now, the present invention is described below further in detail by means of examples.

EXAMPLE 1

Natural pulp having a length of 1.2 cm as agglomerative short fibers was transferred. A Coanda spiral flow generating apparatus having a pipeline with a pipe diameter of 38 mm and a length of 10 m, and an inclination angle $\theta$ of the curved wall surface of tan $\theta = 1/6$ was employed. A Coanda spiral flow was produced by feeding air under a pressure of 5.2 kg/cm² with a flow rate of 200 Nl/minute.

As a result of the natural pulp could be transferred at a flow velocity of 40 m/second, and after transfer, a dissociated state could be achieved. The natural pulp after transfer was mixed into an adhesive binder with no further treatment: these could be easily and uniformly mixed.

It was tried to transfer natural pulp by means of a turbulent flow from a jet injector, but the natural pulp adhered to the pipe wall and cohered, thus making it impossible to transfer.

EXAMPLE 2

In Example 1, an air pressure of 6 kg/cm² was used for the generation of a Coanda spiral flow, with a flow rate of 500 Nl/minute, and the pipeline (1) was heated to 150° C.

Also in this Example, the natural pulp could be satisfactorily transferred. Particularly, the apparent volume of the natural pulp after transfer was 3.5 times as large as the initial one at the start of feeding.

Short fibers of the natural fibers thus oriented-transferred were blown with no further treatment into a laminated adhesive layer to manufacture an oriented fiber intensified composite material, which was excellent as a building member.

EFFECTS OF THE INVENTION

According to the method for transferring short fibers of the present invention, in which agglomerative short fibers are oriented-transferred by means of a Coanda spiral flow produced by feeding a pressurized fluid into the pipeline, while heating as required, short fibers never adhere in the transportation pipeline, without cohesion, and high-speed oriented-transfer of short fibers can be achieved.

According to the present invention, agglomeration of short fibers can be dissociated in the course of transfer, so that it is possible to easily and uniformly mix short fibers after transfer into cement or plastics.

What is claimed is:

1. A method for transferring short fibers in a pipeline which comprises introducing a gas, carrying short fibers, into the large diameter end of a main conical cylinder having its small diameter end connected to a pipeline for transferring said fibers, introducing pressurized gas transverse to the axial flow of said gas and fibers cylinder through an annular slit located at the large diameter end of the conical cylinder so as to generate a Coanda spiral flow through said main conical cylinder and said pipeline to advance the fibers through the pipeline and conical cylinder in a uniform spiral direction without colliding with the walls of said conical cylinder and pipeline, whereby said short fibers are transported in an oriented and non-agglomerated state, through said pipeline to the final destination.

2. A method according to claim 1 in which gas is introduced through said annular slit at a pressure of 2 to 10 kg/cm³ and the short fibers have a length up to 4 cm.

3. A method according to claim 1 in which the fibers are transferred in a heated state.

4. A method according to claim 3 in which a gas reactive to the fibers is used to carry said short fibers and a surface reaction is effected between the reactive gas and said fibers.